Patented Dec. 31, 1929

1,741,477

UNITED STATES PATENT OFFICE

EMIL PFIFFNER, OF FRIBOURG, SWITZERLAND, ASSIGNOR, BY MESNE ASSIGNMENTS, TO RADIO PATENTS CORPORATION, OF NEW YORK, N. Y., A CORPORATION OF NEW YORK

METHOD OF METALLIZING THE SURFACES OF INSULATING BANDS

No Drawing. Application filed March 25, 1926, Serial No. 97,450, and in Germany January 2, 1926.

In my Patent No. 1,731,261, patented Oct. 15, 1929, I have described a method of and means for alternately wetting or coating an insulating band, the surface of which is to be metallized, with a metallic salt solution and a reducing agent.

However in this method there is a drawback which is that quantities of the contents of the reducing bath, are passed into the metallic salt solution by the band which is to be metallized, whereby the activity of the said solution is rapidly decreased and ultimately destroyed.

The present invention consists in that the reducing bath is dispensed with, and the reducing agent such as an aqueous solution of formaldehyde or the like in a finely divided condition is sprayed onto the band already wetted by the metallic salt solution such as an aqueous solution of silver nitrate or the like. Compressed air or steam can be employed as the carrying agent for the reducing agent. In order that traces of the reducing agent are not carried into the metallic salt solution, the wet band may be dried by hot-air or washed by means of water after the spraying of the reducing agent and before its reintroduction into the metallic salt solution. In consequence thereof the reducing agent is not introduced into the metallic salt solution and the latter retains its full activity, until completely used up.

I claim:—

In a continuous process of metallizing the surfaces of insulating bands wherein the band is first treated with a metal salt solution and directly thereafter by a reducing agent and again with the metal salt solution, the steps of spraying the reducing agent upon the treated band and then washing excess reducing solution from the band prior to re-introduction into the metal salt solution.

In testimony whereof I affix my signature.

EMIL PFIFFNER.